(12) United States Patent
Brandwine et al.

(10) Patent No.: US 10,133,867 B1
(45) Date of Patent: Nov. 20, 2018

(54) TRUSTED MALWARE SCANNING

(71) Applicant: Amazon Technologies, Inc., Reno, NV (US)

(72) Inventors: Eric Jason Brandwine, Haymarket, VA (US); Matthew John Campagna, Bainbridge Island, WA (US); Gregory Alan Rubin, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 428 days.

(21) Appl. No.: 15/083,728

(22) Filed: Mar. 29, 2016

(51) Int. Cl.
  *G06F 21/56* (2013.01)
  *H04L 29/06* (2006.01)
  *H04L 9/32* (2006.01)

(52) U.S. Cl.
  CPC .......... *G06F 21/567* (2013.01); *H04L 9/3247* (2013.01); *H04L 63/0428* (2013.01); *H04L 63/18* (2013.01)

(58) Field of Classification Search
  None
  See application file for complete search history.

(56) References Cited

U.S. PATENT DOCUMENTS

| | | | | |
|---|---|---|---|---|
| 7,673,343 B1* | 3/2010 | Barton | ................. | G06F 21/566 713/188 |
| 8,375,449 B1* | 2/2013 | Zhou | ..................... | G06F 21/561 726/24 |
| 8,479,294 B1* | 7/2013 | Li | .......................... | G06F 21/56 726/23 |
| 8,819,830 B2* | 8/2014 | Huang | ................. | G06F 21/564 726/24 |
| 8,910,161 B2* | 12/2014 | Litty | ....................... | G06F 21/56 718/1 |
| 9,455,963 B1* | 9/2016 | Roth | ................... | H04L 63/0464 |
| 9,569,638 B2* | 2/2017 | Zatko | ...................... | G06F 21/71 |
| 9,626,512 B1* | 4/2017 | Brandwine | ............. | G06F 21/57 |
| 9,792,143 B1* | 10/2017 | Potlapally | ........... | G06F 9/45558 |
| 2009/0044273 A1* | 2/2009 | Zhou | ..................... | G06F 21/564 726/24 |
| 2011/0276799 A1* | 11/2011 | Chung | .................... | G06F 21/72 713/165 |
| 2014/0230024 A1* | 8/2014 | Uehara | ............... | H04L 63/1433 726/4 |
| 2014/0281560 A1* | 9/2014 | Ignatchenko | ........... | G06F 21/57 713/181 |
| 2015/0143362 A1* | 5/2015 | Lukacs | ............... | G06F 9/45558 718/1 |
| 2016/0283717 A1* | 9/2016 | LeMay | ................. | G06F 21/567 |

* cited by examiner

*Primary Examiner* — Michael R Vaughan
(74) *Attorney, Agent, or Firm* — Hogan Lovells US LLP

(57) ABSTRACT

A trusted co-processor can provide a hardware-based observation point into the operation of a host machine owned by a resource provider or other such entity. The co-processor can be installed via a peripheral card on a fast bus, such as a PCI bus, on the host machine. The co-processor can execute malware detection software, and can use this software to analyze data and/or code obtained from the relevant resources of the host machine. The trusted co-processor can notify the customer or another appropriate entity of the results of the scan, such that an appropriate action can be taken if malware is detected. The results of the scan can be trusted, as malware will be unable to falsify such a notification or modify the operation of the trusted co-processor.

20 Claims, 7 Drawing Sheets ated malware scanning

BACKGROUND

As an increasing number of applications and services are being made available over networks such as the Internet, an increasing number of content, application, and service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and software to provide access to these resources. A potential disadvantage to such an approach, at least from a customer point of view, is that the resources typically are at a location under control of the provider of those resources, and thus are out of the direct control of the customer. Further, the resources are often shared with other customers such that data, software, and resource security and integrity may be compromised. A customer will often be unable to verify that no malicious software ("malware') or other intrusion effect is present on the resource. Even if a report is provided from the resource, the report cannot be trusted if the resource itself is compromised.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing security in a computing environment. In particular, various embodiments provide a trusted enclave inside a host machine operated by a resource provider, or other such entity, where that trusted enclave is logically owned by a separate party, such as a customer of the resource provider. The trusted enclave in some embodiments can take the form of a peripheral card including a trusted co-processor, where the card is connected to a high speed bus, such as a peripheral component interconnect (PCI bus), in the host machine. The trusted co-processor can have at least one API that the customer can use to call into the trusted co-processor, and the card itself may be at least somewhat customer programmable. The nature of the trusted co-processor, and bi-directional nature of the hardware device hosting the trusted co-processor, enables it to perform trusted scans of the host machine for purposes such as malware detection. The trusted co-processor can obtain the relevant code or data from the appropriate resources (i.e., memory and data storage) on the host machine, and analyze that code or data using malware libraries or other such information to attempt to determine whether the host machine, or relevant resources of the host machine, have been compromised. The trusted nature of the co-processor prevents the co-processor from being compromised by any malware on the host device. The trusted co-processor can generate a notification indicating whether malware was found on the host. If a trusted out-of-band channel is available, the trusted co-processor can provide the notification directly to the customer. Such an out-of-band channel can also be used to update the malware libraries on the hardware device. If an out-of-band channel is not available, and a channel must be used that is accessible to a processor or virtual machine of the host, the notification can be signed, encrypted, or otherwise generated in such a way that it cannot be modified or falsified by the malware on the host without detection. For such a notification the malware can at best prevent the notification from being delivered, which is indicative of the host machine being compromised. If malware is detected, the customer can take a remedial action, such as to cease operation on that host, contact the provider for a new allocation, etc.

Various other applications, processes, and uses are presented below with respect to the various embodiments.

Figure 1:
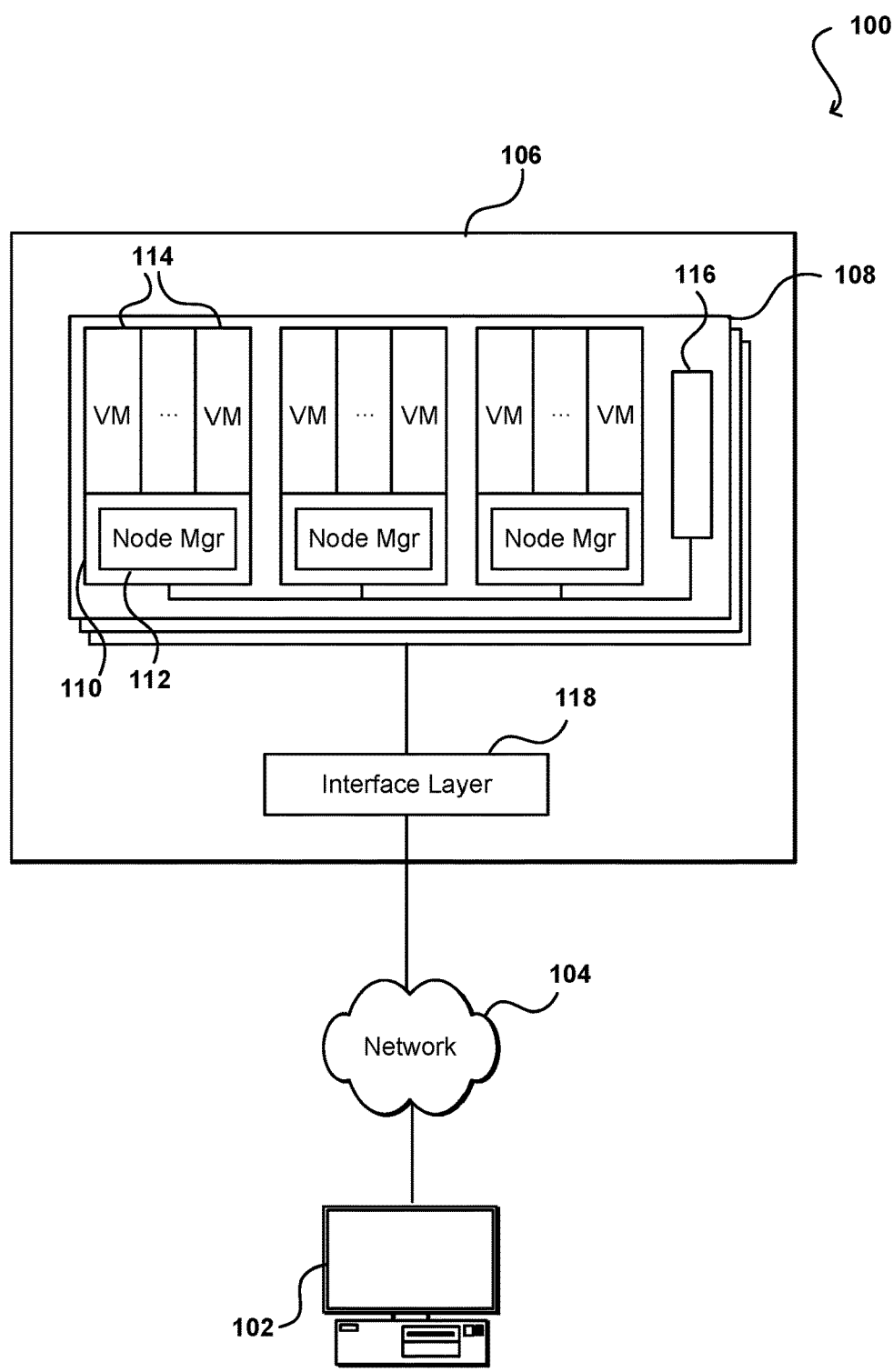
FIG. 1 illustrates an example environment in which various embodiments can be implemented.

FIG. 1 illustrates an example environment 100 in which aspects of the various embodiments can be implemented. In this example, a user is able to utilize a computing device 102 to submit a call or request across at least one network 104 to be received to a shared resource environment 106, such as a data center or "cloud" environment, among other such options. The computing device 102 can include any appropriate device, as may include client devices such as personal computers, cell phones, handheld messaging devices, laptop computers, set-top boxes, personal data assistants, electronic book readers, and the like. The at least one network 104 can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail.

The resource environment 106 in this example includes an interface layer 118, as may include components such as application programming interfaces (APIs), routers, switches, Web servers, and other such components known or used for routing communications from a user computing device 102 to an appropriate resource in the environment. In this example, the resource environment 106 includes a number of racks 108, each rack including a number of host computing devices 110, as well as an optional rack support computing system 116 in this example embodiment. The host computing systems 110 on one of the illustrated racks 108 each host one or more virtual machines 114 in this example, as well as a distinct virtual machine manager 112 associated with the virtual machines on that host computing system. The virtual machine manager (VMM) is tasked with managing the virtual machines (VMs) on the respective host device, and handling various aspects of virtualization. Each virtual machine 114 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system 116 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 106. Each computing system may also have one or more local attached storage devices (not shown), such as to store local copies of programs and/or data created by or otherwise used by the executing programs, as well as various other components.

It will be appreciated that the example of FIG. 1 has been simplified for the purposes of explanation, and that the number and organization of host computing systems and other devices may be much larger than what is depicted in FIG. 1. For example, as one illustrative embodiment, there may be approximately tens of thousands of computing systems in a cloud environment, with at least some of those computing systems being host computing systems that may each host multiple virtual machines.

Figure 2:
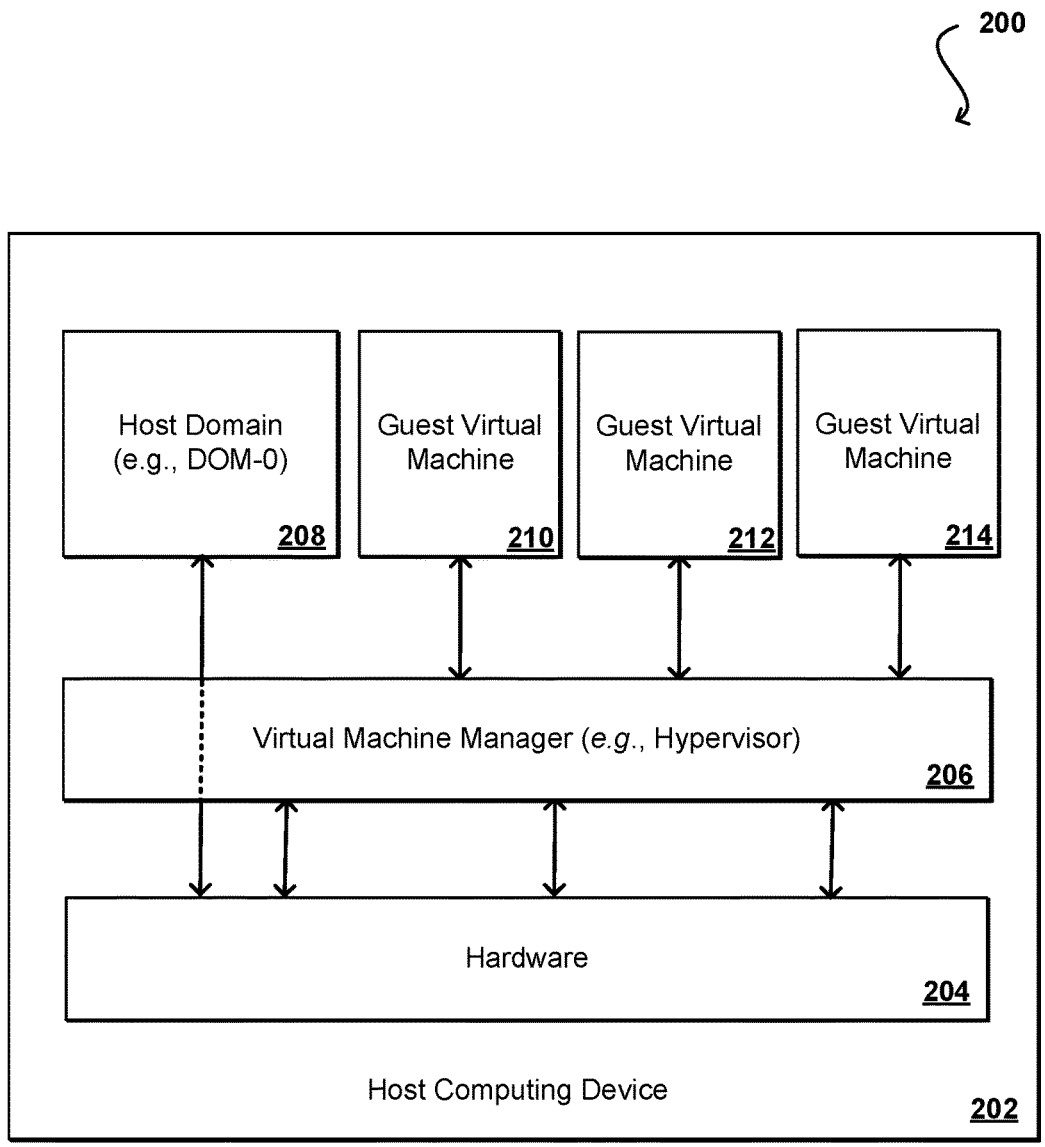
FIG. 2 illustrates an example configuration for a virtual machine manager running multiple guest virtual machines that can be used in accordance with various embodiments.

A number of virtualization techniques can be used to simultaneously operate a plurality of guest virtual machines (VMs) or guest operating systems (OSs) on a given host machine. FIG. 2 illustrates an example 200 of utilizing one virtualization technique using a virtual machine manager (VMM), such as a hypervisor, in accordance with various embodiments. The hardware 204 (e.g., the central processor and other such components) of the host computing device 202 is able to interface with the VMM 206 running directly on the hardware 204, such in the case of a "bare metal" or native hypervisor. Examples of hypervisors useful for such purposes include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 208 that may include an administrative operating system for configuring the operation and functionality of the hypervisor 206, as well as that of domains of lower privilege, such as the domains of the guest virtual machines 210, 212, 214 or other operating systems, which may be heterogeneous (i.e., running different operating systems than each other). The host domain 208 (e.g., the DOM-0) may have direct access to the hardware resources 204 of the host computing device 202 by way of the hypervisor 206, while the guest virtual machine domains 210, 212, 214 may not.

In certain embodiments, there can be various modes of operations. For example, to update the microcode on a host computing device, the host computing device can receive an update from a trusted source and enter a system management mode (SMM), such as by receiving a system management interrupt (SMI) to interrupt normal hypervisor execution. Entering SMM causes the execution of all the physical processor cores except for a single physical core (e.g., the bootstrapping core) in the processor to be suspended in at least some conventional designs. The single physical core that remains executing will be responsible for applying the update. In some embodiments, it may be ensured that the processor finishes executing all of the update for the particular instruction that it was executing at the time of detecting the SMI or other interrupt signal before suspending the execution of the physical cores. The received update (e.g., for firmware, software, or microcode) can be signed and/or encrypted by a trusted source, such as the service provider or processor manufacturer. In one example, the update can be signed using a private key or other such credential of a trusted source in order to ensure authenticity of the update. If the update is signed using a private key, the host computing device may need to validate the signature of the update before applying the patch. In some embodiments, the public key used to verify the signature can be stored in a trusted platform module (TPM) (not shown) on the host computing device. In some embodiments, the update can be encrypted using asymmetric or symmetric cryptography. For example, the update may be encrypted using a public key in order to ensure privacy of the update. If the update is encrypted, then any intermediate parties that handle the update cannot read the update or ascertain its contents unless they have access to the private key used to the decrypt the update. If the update is encrypted, then the private key to decrypt the update can be stored to the TPM, similarly to the public key for verifying the update, as previously described. Once the update is authenticated and/or decrypted, the update can be applied to the host computing device 202. If SMM is used to apply the update, then the instructions to apply the update can be implemented in an SMI handler, or SMI handler can cryptographically verify and call a patch function pre-configured in a hypervisor. A potential downside to such an approach, however, is that the virtual machine manager (VMM) on a host machine that is exposed to one or more outside users can become compromised. As a result, one of the guest virtual machines (VMs) 210, 212, 214 on the host computing device 202 can potentially access the TPM in the host hardware 204 through the hypervisor 206.

Figure 3:
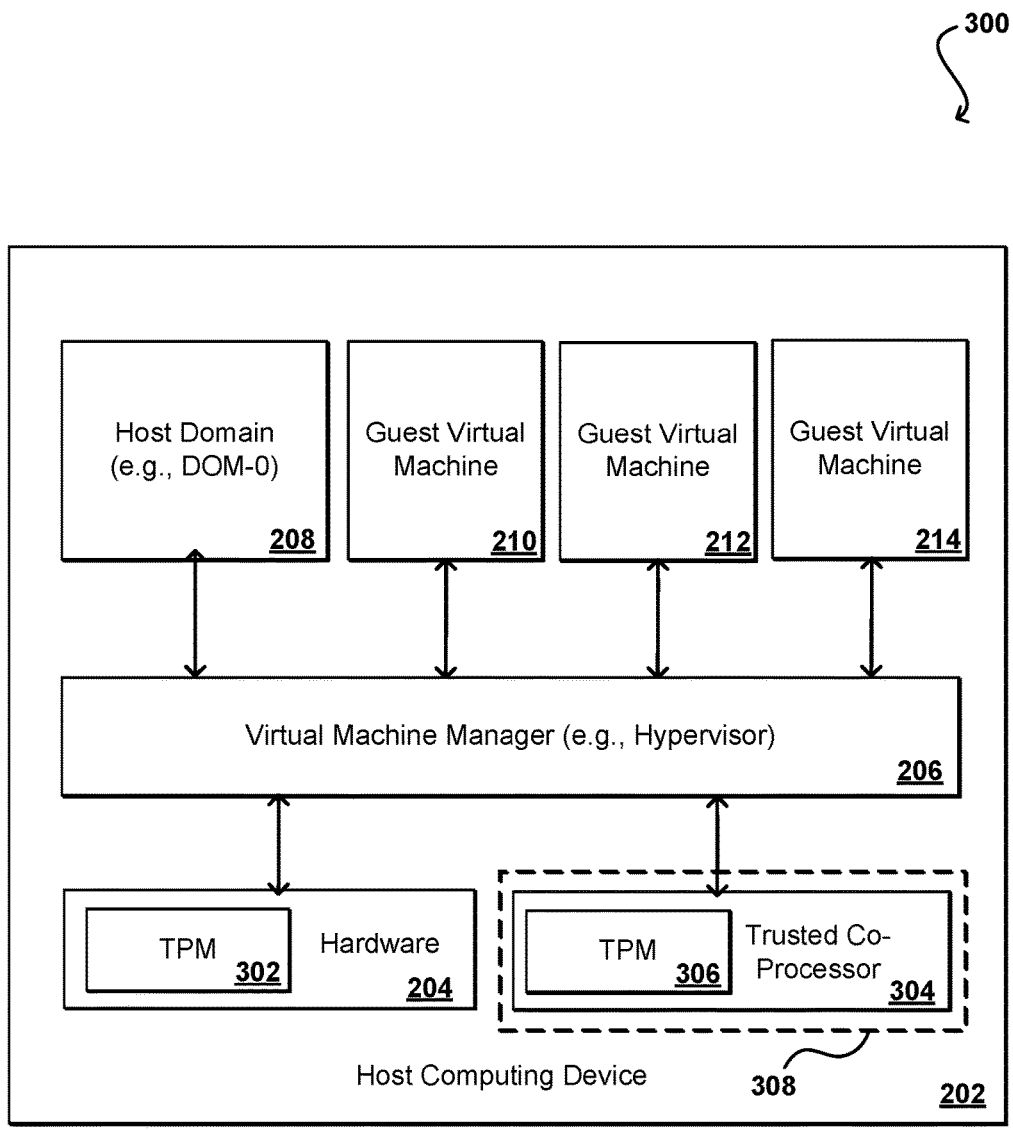
FIG. 3 illustrates an example environment including a trusted co-processor that can be utilized in accordance with various embodiments.

Approaches in accordance with various embodiments can attempt to improve security in such an environment while ensuring that customer secrets, keys, secure data, and other such objects are well secured within that environment, and that no unintended or unexpected modification of the environment has occurred. FIG. 3 illustrates an example environment 300 that can be used to provide such security. It should be noted that reference numbers for similar components can be carried over between figures for purposes of simplicity of explanation, but such usage should not be interpreted as a limitation of the scope of the various embodiments unless otherwise specifically stated. In this example, the host computing device 202 includes (or is capable of receiving) a trusted co-processor 304, or secure co-processor, that can communicate with the VMM 206 and other components of the host machine. The trusted co-processor 304 can be provided via a peripheral device, for example, such as a PCI device that is removable from the host computing device 202. The trusted co-processor can include one or more processors, memory, one or more interfaces, and any other components or connections known for providing a peripheral device or additional processor to such a system. In one embodiment, the trusted co-processor is an independent hardware component that takes the form of a separate PCIE card that includes specific firmware. The configuration of the trusted co-processor enables it to be logically considered to be within a trust boundary, cryptographic boundary, trust region, or trusted enclave, associated with the customer VM. In at least some embodiments, the peripheral card can be manufactured, configured, or otherwise provided by a provider of the resource environment, or an entity trusted by the provider, such that the provider can have a higher level of trust in the security of the peripheral card, or other such additional or removable hardware, than in the security of the raw host computing device 202.

A trusted co-processor 304, or other such hardware device, can provide the advantage of being able to offload many of the administrative tasks from the host computing device 202 such that the host computing device can be substantially dedicated to hosting customer virtual machines, processing customer data, or performing other such tasks. The computational resources dedicated to the customer can thus be provided by the host computing device, enabling the host hardware usage for customer tasks to be maximized, while the administration of those resources is managed by the trusted co-processor. This has the further advantage that all administrative processes will be run in a trusted computing environment 308, or within a trust boundary corresponding to the hardware with the higher level of provider trust. A further advantage is that the provider can provide security assurances that provider access is limited to only the necessary resources, and the system is running trusted software.

The components such as the trusted co-processor 304 within the trusted computing environment 308 thus can be logically considered a sub-system on the host device, where that subsystem has relatively limited functionality. This separate, "limited" subsystem is contained within the associated cryptographic boundary, and is referred to herein as "l-sys." At least a portion of the hardware of the host can then be dedicated to providing and maintaining the virtual machines, or virtual hosts, running on the host machine. This "main" subsystem, contained within a separate cryptographic boundary, is referred to herein as "m-sys." The provider access thus can be at least somewhat limited to the l-sys for purposes of provider administrative functions for the guest machines hosted in the m-sys.

Even with such separation and limiting of provider access, however, the provider will still need to be able to provide assurances to customers (with virtual instances running in the virtual environment) that the virtual image for each customer instance is in a "pristine" or expected state, without unexpected modification, and that the instance is running in a trusted execution environment. Assurances can be provided using a tiered or chained credentialing mechanism, whereby subsystems can have their own credentialing mechanisms enabling the subsystems to be identified and the software and virtual systems running on top of subsystems to be verified as authentic. Each subsystem in at least some embodiments can have its own cryptographic boundary, secure storage, and trusted computing capabilities, as well as an ability to run additional firmware and software.

Further, at least some subsystems can utilize separate memory and processor space as part of a trusted computing environment, such as may be modeled as a trusted platform module (TPM) or other such component. A TPM can be used to perform remote attestation, such as to remotely verify the authenticity of a system running on a host. By providing a series, chain, or hierarchy of TPMs, for example, the subsystems can be identified and the software and virtual systems running a top those sub-systems can be verified as authentic. Although examples discussed herein relate to a two-system host, including the l-sys and m-sys, it should be understood that various other numbers and/or configuration of subsystems can be used as appropriate within the scope of the various embodiments.

One approach for verifying that the embedded systems were not unexpectedly modified or tampered with, and that the embedded systems and virtual machines will function as expected, involves remote attestation. Remote attestation provides for the detection of unauthorized or unexpected changes to a computing environment, such as various subsystems described herein. These changes can include modifications to attempt to circumvent security measures. During a conventional remote attestation process, a host machine can generate a certificate indicating the software currently running on the host. The certificate can then be provided to the customer, or another appropriate party, in order to prove that the software currently executing in the environment is unmodified or as expected. Remote attestation can take advantage of public key encryption, for example, to ensure that the information regarding the software is only exposed to the party requesting the attestation, or other party having obtained the appropriate key. A TPM in general is a dedicated microprocessor that can secure hardware by installing cryptographic keys into the hardware. A TPM can utilize a unique encryption key that is inaccessible outside the TPM in order to enforce expected behaviors on the hardware and software of the host. In some embodiments the unique key is an endorsement key, such as a 2048-bit RSA public and private key pair, that is immutable and unable to be exported from the TPM. The public key for the endorsement key can be contained within a certificate for the TPM. A TPM can perform remote attestation in some embodiments by generating a hash summary of the hardware and software configuration of the corresponding environment or subsystem. The hash value can be generated using any appropriate cryptographic hashing algorithm, such as may generate MD5, SHA-1, SHA-2, or SHA-3 hashes.

Approaches in accordance with various embodiments can utilize a first TPM 306 in the l-sys, or peripheral with trusted co-processor 304 in this example, and a second TPM 302 in the m-sys, or remainder of the host computing device 202 in this example, to perform remote attestation. The trusted l-sys environment 308 can function as a root of trust for the attestation of one or more other subsystems, such as the m-sys, on the device, capable of performing an attestation of the m-sys. The l-sys can generate an attestation integrity key pair and a host identity key pair, with the public key bound to a certificate from a certificate authority as discussed previously. That information can be used to uniquely identify the device within the infrastructure, as well as to generate a hash for attestation. In some embodiments, an attestation request will include some type of question, task, or challenge, and the device receiving the request can gather the information with the question, task, or challenge and generate a hash to be returned to the source of the request (or another appropriate party or destination). The attestation request can be received through an API and triggered through a console or other such interface. In some embodiments the attestation request can come from within the customer virtual machine, such as from a virtual TPM or other such attestation device. The requesting party can then use its copy of the appropriate key to ensure that the correct challenge was included, as well as the expected values for all information for the challenge. This can help to ensure that the software, hardware, configuration, and/or other aspects of the l-sys are as expected and no unexpected modification has occurred. Once the l-sys is verified to be operating as expected, the l-sys (which can include firmware under control of the provider) can boot or otherwise initialize the m-sys, or upper level system. The m-sys can also have a TPM that can generate an attestation integrity key pair and a host identity key pair, with the public key bound to an appropriate certificate. That information can be used to uniquely identify the device within the infrastructure, as well as to generate a hash for attestation. In this example, the l-sys can be the certificate issuing authority for the m-sys. The l-sys, or trusted co-processor, can thus issue the certificate, act as a certificate sub-authority, and certify that it is physically attached to the m-sys TPM, since the trusted co-processor has a physical connection to the host. Such an approach can provide a full attestation chain. A customer or other entity wanting to attest a host can obtain an attestation through the certificate of the m-sys, corresponding to the host of the designated virtual machine, that is chained to the l-sys, and the peripheral card or trusted co-processor, which is chained to the original certificate authority.

In one example, a customer system is communicating with a customer virtual machine running on a virtual host in the resource provider environment. The customer system can be aware of information such as an instance identifier (ID) bound to the virtual machine, as well as a host ID for the host computing device running the virtual machine. The customer system can then send an attest command, or attestation request, to the customer virtual machine. The virtual machine can receive the request, which may arrive through the peripheral device or l-sys in some embodiments. The virtual machine can receive the instance ID and the host ID and determine that the virtual machine has correctly received the request, and that an attestation should be provided. In order to provide the attestation, information needs to be returned for both the trusted root system, or l-sys, and the main system, or m-sys. In this example, the virtual machine can send an attest command to the l-sys, which can generate the appropriate hash using the expected information and the challenge of the attest command. The l-sys can also send an attest command to the m-sys, which can generate a similar hash for the m-sys information. The hash of the m-sys can contain information for the expected boot image of the customer for the virtual machine. The virtual machine can obtain both hash values, for example, and can send back the appropriate information for the attestation. This can include, for example, the hash values for l-sys and m-sys, as well as the certificate chain for the l-sys and m-sys. The customer system receiving the information can verify that the image is as expected and can trust the attestation chain. A customer system getting quotes (or other measurements, which may be signed) for each subsystem can also verify the signature on each quote, as well as the values within those signatures. The customer system can also verify that the m-sys certificate was issued by the l-sys, and the l-sys certificate was issued by a trusted certificate authority. As long as the customer trusts the certificate authority, the customer should be able to verify the information indicating that the customer virtual machine is operating as expected.

The information provided as part of the hash for verification purposes can include any appropriate information for the relevant subsystem. For the l-sys where the trusted co-processor is on a peripheral card, for example, the hash can include values for the PCR registers, or information for the firmware for the trusted co-processor. Various other types of information can be utilized as well. A determination of which information to include can balance the usefulness of including a lot of information, which provides increased security that the system or environment is operating as expected, with the need to maintain knowledge of the current state of the system or environment such that the customer system can know or determine the appropriate hash to expect for the current state. An advantage to using a chain of attestation is that the l-sys, in addition to being a more trusted environment due to the nature of the subsystem, is a more controlled and simple environment, such that the likelihood of a hashing or matching error is significantly reduced, and the likelihood of compromise is significantly reduced as well. Since both the hardware and software of the m-sys will be sourced from outside the resource provider environment, in many cases, there can be fewer or weaker assurances that the environment is secure. The nature of the subsystems makes it beneficial for the trusted subsystem to be able to certify the other due to the level of trust in the l-sys and the physical connection of the l-sys to the m-sys, among other such advantages.

As mentioned, a benefit of using a device connected to a core system bus (such as a PCI bus or other high-speed bus mastering direct memory access (DMA)) is that it is difficult to behave maliciously over such a bus. The device typically will be involved with high speed transactions that deal directly with the memory of the host system. The ability to provide a trusted co-processor on a core system bus of a host computing device, particularly one that is programmable, provides for an increased level of trust and functionality over conventional approaches. In some embodiments, the ability to provide such a device can modify the ownership model for various resources. For example, customers of a resource provider environment might want to take advantage of various services and offerings, such as scalable computing and Web services, but the customers might not receive the level of trust needed to embrace these offerings. These customers may want to be able to verify operation and state of the resources performing tasks on behalf of those customers, regardless of whether the resources are in a customer environment or a resource provider environment, such as a data center.

Accordingly, approaches in accordance with various embodiments can become at least the logical owners of such observation point devices, whether those devices are located in computing devices at a client site or in a resource provider environment, among other such options. These observation point devices can be PCI devices, for example, that communicate via a PCI bus and enable the logical owner to perform observational tasks such as to interrogate memory, analyze processes running on the device, etc. The access can be limited to the observation point device, however, such that the logical owner cannot gain unauthorized access to other resources or data on the host computing device. This can provide a customer, or other logical owner, with assurance that the host computing device is operating as expected while preventing the customer from performing unauthorized tasks on the computing device.

Figure 4:
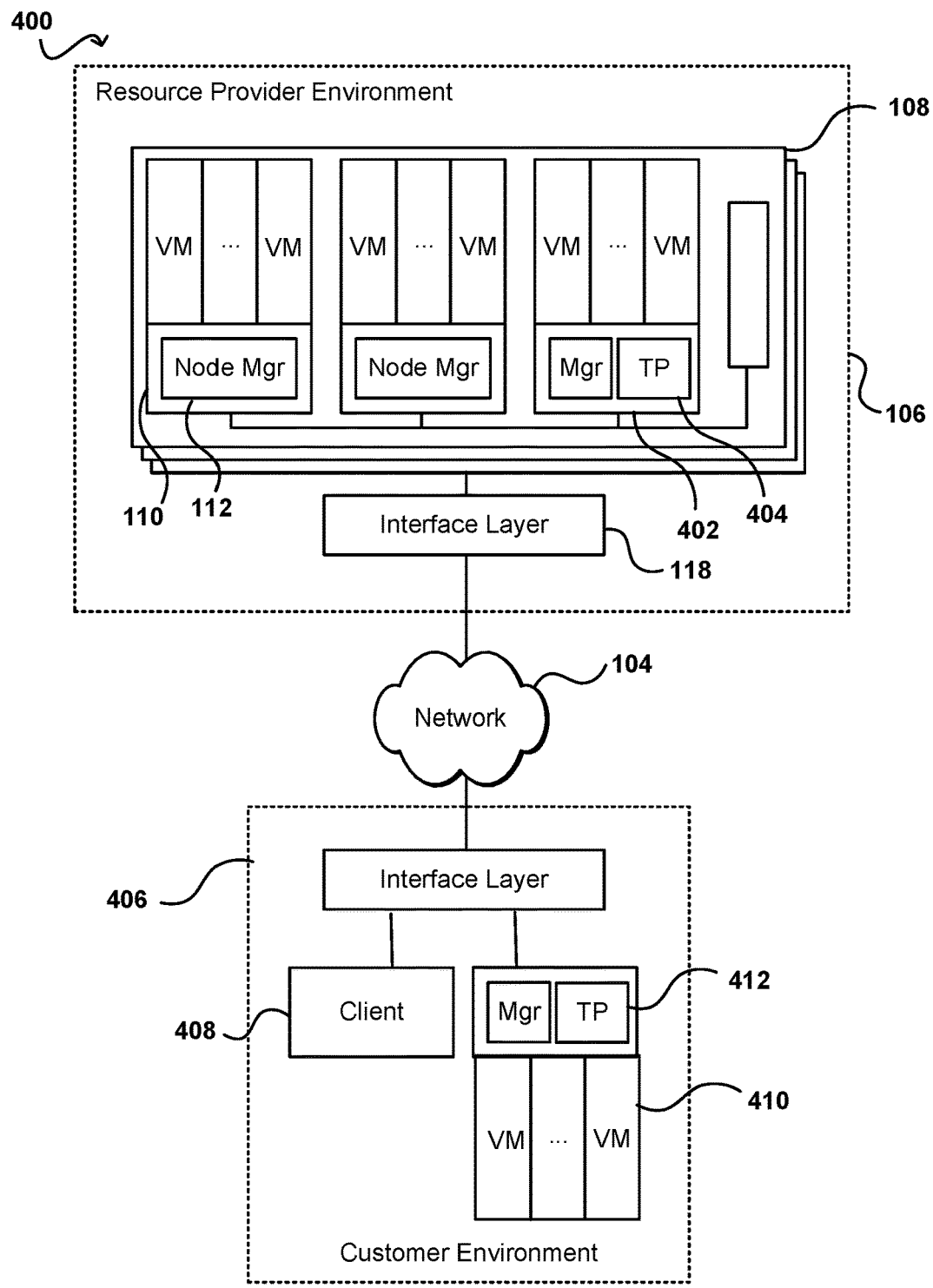
FIG. 4 illustrates an example environment wherein a trusted co-processor can be provided to a customer through a customer environment and/or a resource provider environment that can be utilized in accordance with various embodiments.

As illustrated in the example situation 400 of FIG. 4, an observation point device can be placed in a customer environment 406 or a resource provider environment 106, or both. The device can be a PCI device, a trusted co-processor, or another mechanism for providing such a trusted enclave. A first trusted co-processor 404 is illustrated on a specific host machine 402 (similar to the host computing device 300 of FIG. 3) in the provider environment, and a second trusted co-processor 412 is illustrated on a host machine 410 in the customer environment 406. In such an example, a customer can use a client device 408 to request observational data from either of the trusted co-processors 404, 412. In various instances the trusted co-processors, or PCI devices, can be provided by the resource provider, or service provider, such that the provider can configure the device to only be able to read or write to certain areas of memory on the respective host device. In some embodiments the device might only be aware of certain areas of memory. As discussed previously with respect to FIG. 3, the trusted co-processor can include a TPM for storing cryptographic materials and performing cryptographic functions. In at least some embodiments such a device can thus measure its own software to ensure that the installed software is as expected. The client device 408 can connect to the device, such as the first trusted co-processor 404, and can know reliably that the client device is connected to the trusted co-processor. The client device can also determine that the trusted co-processor is running the software that it is expected to be running.

The trust in the co-processor can be rooted in a variety of different ways. As an example, a disclosure can be made as to the makeup of the PCI device and the reasons why the device should be trusted. This disclosure can come from a trusted party such as a third party auditor or a disclosure of the source code for the device. The customer can then be sure that there is no man-in-the middle, or malicious firmware running on the trusted co-processor. Once the customer is able to trust that the customer is communicating directly with the communication point in a trusted way, the customer can run various queries to determine information such as the processes running on the host computing device, the users logged into the device, a list of guests running on the host and proof that those guests correspond to the customer, etc.

The trusted co-processor can also have at least some measure of programmability. In some embodiments the device will provide at least one API. The trusted co-processor can include enough processing power that the customer can upload code that can run on the PCI device to perform a set of checks and provide notification of anything unexpected. The API can also be accessible over the network, such as may be queried by the client device 408. In some embodiments the customer have execute auditing software, on the customer site or in a data center, for example, that can query the API and fetch the data for analysis and verification.

Such an approach is an improvement over conventional approaches at least for the fact that conventional approaches do not allow customers to take ownership of a trusted component, particularly a programmable component, operating in a host computing device and capable of performing the functionality discussed herein. In some embodiments the trusted co-processor includes an IOMMU as discussed previously, which provides a memory management unit specifically for I/O operations. A host computing device can accept input from potentially untrusted parties, such as through remote direct memory access (RDMA), which is a low latency, low overhead approach. In order to quickly move data, the hardware can, at a very low level, move data to be stored in RAM on a destination machine, then notify software executing on the destination machine. Such an approach incurs cost for the bus and RAM bandwidth, but incurs no cost for any CPU cycles that would otherwise be involved in moving the data. A customer, however, generally will not want to provide a remote party with the ability to write to random addresses in a host machine. Various approaches provide at least some level of filtering, such as where a user can write to certain ranges if specified conditions are true, and is prevented from writing to other ranges no matter what.

Approaches in accordance with various embodiments can instead take advantage of the trusted co-processor that is highly programmable. The trusted co-processor in at least some embodiments can verify the presence of a processor connected to a bus interface, which includes an IOMMU and other bus interface bits. The trusted co-processor can also verify that the bus interface is plugged into a PCI bus or other bus within the computer. That IOMMU and the bus interface bits can be intelligent enough to indicate actions to be taken if a specified processor requests memory in a certain range, or deny a request to perform a memory operation in a different range.

A trusted co-processor, or PCI device, can effectively have two owners in at least some embodiments. A resource provider in one example will own the hardware, including the bus interface, the IOMMU, and other such components. The customer can be the logical owner of the compute enclave with the TPM, which can enable the customer to verify that the provider (or at least the host machine) is operating as expected. In at least some embodiments it can appear to the customer that the customer's trusted co-processor has full PCI bus access, but that access will in fact be limited or partial, and the main processor on the host that is owned by the resource provider can also have at least partial access on the host computing device.

In one example, a trusted co-processor can be used to verify that there is no "man-in-the-middle" that can impact the operation. In a TPM bootstrap approach, there is an initialization step that the customer trusts. This can involve, for example, the customer hand assembling the PCI device, including burning the keys into the TPM, and then watching (directly or through a trusted third party) those devices be placed into the corresponding host devices. The process can continue depending upon the level of trust, and in some cases can include watching the server get placed in the rack and then monitoring the rack to ensure no swapping or modification occurs.

Another approach involves an endorsement key being included in the TPM on the trusted co-processor. The endorsement key can be burnt into the hardware of the TPM at the factory. Some manufacturers will sign the endorsement key, turning the key into a certificate. Manufacturers can also sign the certificate signing request generated using the endorsement key, turning it into a certificate. A customer or other entity who did not build the TPM can nevertheless verify that the conversation being had is with a TPM manufactured by a specified manufacturer and includes a key with a specified fingerprint, and thus determine that use of the TPM is likely acceptable.

In one embodiment, measurements of a virtual machine manager (i.e., hypervisor) running on a host machine can be published. A resource provider can indicate the expected measurement (i.e., a SHA-256 hash value) for a range of memory locations. If the host is operating and/or configured as expected, the measurement value for the software over those memory ranges should not change. A customer wanting to verify operation of the box can select to only run "verifiable" virtual machine instances on hosts that include a trusted co-processor that is logically owned by the customer. In some embodiments a customer can be given a mapping that indicates which instances are running on which host machines, or other hardware, that can be verified using a particular identifier. The customer can be provided with a cryptographic key that the customer should expect to receive when attempting to connect to the verifier. When the customer connects to the verifier, the verifier can produce the expected key embedded in a certificate that is signed by a certificate authority that is trusted by the customer. This can enable the customer to be confident that they are connected to the correct verifier. The customer can then issue commands to that verifier, in order to verify that the software running on the verifier is correct and as expected. Once the customer is comfortable with the verifier, the customer can begin to query the verifier regarding the host computer.

A device-side IOMMU is not required for all trusted enclaves discussed and suggested herein. On the device side an IOMMU can help to partition the devices that are part of, for example, a system on a chip implementation. There can be different contexts, and there can be limits placed on the device memory (e.g., DRAM) that is attached to the system on chip and accessible during the various contexts. An IOMMU is not a necessary component for providing access to the host DRAM. In some embodiments a motherboard on the host side could be programmed from the trusted enclave, but could require some software cooperation.

As mentioned, customers can have the ability to submit queries regarding a specific host computer to verify that they are communicating with the expected computer. A customer can also have the ability to cause certain memory patterns or other specific indicators to be stored for a virtual machine, for example, that can enable the customer to determine that something very close to their virtual machine instance is running on the computer. The customer can then use the verifier to, over the PCI bus, query for the memory ranges that cover the virtual machine manager. The customer can generate the expected checksum and compare that to a checksum for the memory ranges to verify that the software located in the pages indicated by the virtual machine manager match. In some embodiments a customer can submit various API calls that enable them to interpret various management tables of the virtual machine manager, as well as to verify that there is one instance running on this box that is owned by the customer with no other instances running, etc. The customer can verify the trusted environment and use that environment to execute their software. Interrogating the PCI bus using the trusted co-processor and receiving expected results that only the customer would have can provide some level of assurance that the box that their instance is running on is in a valid and trustworthy configuration.

Various functionality discussed herein can be implemented without a dedicated co-processor, PCI device, or other such dedicated hardware. In some embodiments a protected enclave can be provided a trusted boot-type virtual machine. An advantage to a hardware device is that the device can be shipped to a customer and installed in a customer host in order to enable the customer to obtain desired functionality. In one example, the installing of such a device can enable the customer capacity to be virtualized using the specified APIs and the resource provider network. In that case, the customer can have a machine that is owned by the customer and a PCI device or trusted co-processor that is owned by the resource provider. In various embodiments discussed herein, however, the host machine is owned by the resource provider and contained in the provider network, and the trusted co-processor is logically owned by the customer. Customers may also be more likely to trust hardware they can inspect than a process running in a remote environment, particularly where the trusted co-processor is completely separate from the virtual machine manager or the host operating system.

As mentioned, a PCI device or other such trusted hardware device including a trusted co-processor can provide for bi-directional communication between the device and the host machine. This can help a customer to verify that false responses are not being generated or provided by the host machine or the trusted device. The bi-directional communication can provide for various types of additional functionality as well. For example, a debugger can execute on the trusted device and communicate with the host device to perform tasks such as CPU and kernel debugging. The trusted hardware acts as a trusted observation point into the host machine, and in addition to being able to view the code stored on the host machine, the bi-directional communication enables the trusted hardware to debug and then write the appropriate code to the host machine. The trusted hardware can also potentially receive instructions from a customer, where that customer trusts communication with the trusted hardware, and cause those instructions to be executed on the host machine.

In various embodiments, the trusted hardware can include code or an application for running a malware scan on the attached host machine. An instruction can be received to a trusted co-processor, for example, which can execute the malware code on the trusted hardware and cause the relevant code or data on the host machine to be analyzed for malware. The instruction can be received from a customer, application, or other such source, whether through the host machine or an out-of-band channel dedicated to the trusted hardware, as may be provided through a wired or wireless connection. The trusted hardware can conduct the scan and generate a report to be provided to the customer or another appropriate or designated destination. The report can be provided through a trusted out-of-band channel or through the host machine. The report can be generated or encrypted in such a way that the host machine cannot fake the report if the host is compromised, but can only prevent the report from being delivered. The lack of delivery of a report thus can be an indication that the host machine may no longer be trusted for various operations.

Malware, otherwise known as malicious software, includes code or instructions that can be used to perform undesired, unintended, or malicious functions on a computing or processing device. This can include, for example, modifying or disrupting operation of the device, providing unauthorized access to the device, gathering data from the device, or displaying unwanted content such as advertising or propaganda, among many others. Malware is often designed to go unnoticed by users of the computing device in order to enable the malware to operate over long periods of time without detection and/or removal. Malware can include types of software referred to as spyware, viruses, Trojan horses, worms, and adware, among others.

In order to combat malware, a computing device can execute malware detection software. The detection software can scan the processes executing on the computer, as well as the memory, storage devices, and other relevant components. A difficulty with running malware software on a host machine in a shared resource environment, however, is that the malware can be assumed to be controlling the machine, or at least various functionality executing on the machine. If the malware is controlling the machine, then no information provided from the machine can be trusted, including a report that the machine is free from malware. Malware such as a rootkit can obtain root or administrator level access, whereby the malware can obtain full control over the system and perform tasks such as modifying software and remapping data stored on disk or in memory. This can enable the machine to return uncorrupted data from one location even though the actual data being checked may have been corrupted in a different location.

An advantage to using a trusted hardware device such as a PCI card with a co-processor, however, is that malware on the host machine cannot perform any of these attacks against the trusted device. The trusted hardware device has high-level privileged access to the host machine, as discussed above, and thus is not accessible to malware on the host machine. The trusted hardware can query memory and other resources of the host directly through the hardware, for example, and not going through the virtual machine. This privileged access enables a malware scanner to execute in the trusted hardware device that is able to communicate with the relevant virtual machine(s). One advantage of this approach is that it may be easier for the customer to integrate with the virtual machine than to integrate directly with the trusted hardware. Thus, in at least some embodiments a trusted co-processor can function similar to a trusted platform module (TPM) in that the trusted co-processor can provide an attestation that a customer VM, for example, is currently malware free. The trusted co-processor can expose that attestation to the customer through the VM, who can monitor the status. If the trusted co-processor stops indicating that the customer VM is malware free, the malware cannot forge an innocent response stating that the VM is malware free. As discussed, the malware can at best hide the positive response which would then not be surfaced to the customer through the VM, which is indicative of a problem with the VM. As mentioned, however, in some embodiments the report can be exposed through an out-of-band channel inaccessible to the customer VM, such that the customer can trust in the report and any failure to receive a report is indicative of the trusted co-processor not executing properly. In some embodiments the trusted co-processor can trigger SMS events or launch applications in response to detecting malware, among other such options.

It should be noted that using a trusted hardware device such as a PCI device with a trusted co-processor has advantages over conventional malware scanning devices since the device communicates through a different location in the host machine. The PCI device enables communication to be performed and analysis to be obtained without being mediated by the processor and operating system of the host machine, as would be the case for a device plugged into a serial port or USB port, for example. The ability to communicate independent of the host processor and OS means that the communication is not impacted if the processor or OS of the host are compromised. The connection through a PCI bus or similar interface, however, provides for low level monitoring and integration independent of the host processor and OS. The device can, however, have the ability to perform tasks similar to those performed by the host processor, such as to directly query memory or storage. The presence of the trusted device can also be unknown to the host processor in at least some embodiments.

In order to ensure that the malware detection software can detect the most recently discovered types of malware, the libraries or other information stored on the trusted hardware should be frequently updated. In order to ensure proper malware detection, however, the updates in at least some embodiments must be delivered in a way that cannot be impacted by a compromised host device. In some embodiments, the trusted hardware can be unplugged, the libraries updated outside the host device, and then the device placed back in the host device, such as in a PCI slot. This can be relatively impractical, however, particularly for large numbers of hosts or frequent updates. Further, such an approach makes the trusted hardware and/or host machine unavailable for a period of time. If there is a trusted out-of-band channel available to the trusted hardware, the libraries or updates can be provided using that channel. If a trusted out-of-band channel is not available, the updates can be provided through a conventional channel, but the channel will generally be accessible to the host processor such that the contents of the message may be compromised. Accordingly, approaches in accordance with various embodiments can utilize signed payloads, where the update is signed using a digital signature or other credential, for example, that is not available to the host machine. Upon receiving and using the information to update the malware libraries on the trusted hardware, the trusted co-processor can generate and send a response that is also signed using the same (or another designated) credential. If the customer does not receive back a signed response, then the customer can assume that the host machine is compromised or the system is otherwise not operating as expected. In some embodiments the trusted hardware can monitor incoming traffic and for any user datagram protocol (UDP) or other packet received on a specific port with a specific set of headers and checksums, for example, can intercept and use those packets without knowledge of the host processor.

In many embodiments, the trusted co-processor would only scan and detect malware, and generate some type of notification in response to detecting malware or other unexpected modifications or behavior. In many cases this notification will be provided to a system or device associated with the customer, but in other cases the notification (or an additional notification) will be provided to a management component, or other such system or service, or the shared resource environment in order to notify an administrator or other entity that one or more resources in the environment is infected with malware, and action should be taken to prevent other resources from becoming similarly infected. In some embodiments, however, the trusted co-processor can use the bi-directional communication and its access to host memory and storage to attempt to remove the malware as well. This can function as would a conventional malware removal process, whereby the software executing on the trusted co-processor would attempt to undue any changes made by, or for, the malware on the host machine. In some cases both notification and removal can be offered to customers, as may be associated with different monthly costs or types of customer accounts, among other such options. In some cases the malware software can be provided and updated by a third party software vendor or service, under the terms of the customer account or instruction of the customer, among other such options. Processes such as debugging and host intrusion detection can utilize at least some of this functionality as well, as discussed and suggested elsewhere herein.

While many examples discuss a trusted co-processor under logical ownership of a customer being installed in a provider-owned host machine, such a device can be logically owned by a provider and installed in a customer device. This can enable the provider to obtain information about the state of malware on the customer device, for example, which can then be used to determine whether to grant the customer machine access to a provider system or service, among other such advantages. Such an approach also can be utilized by a malware removal service, where trusted malware information about the customer machine can be provided to the service for reporting, notification, and/or action.

Figure 5:
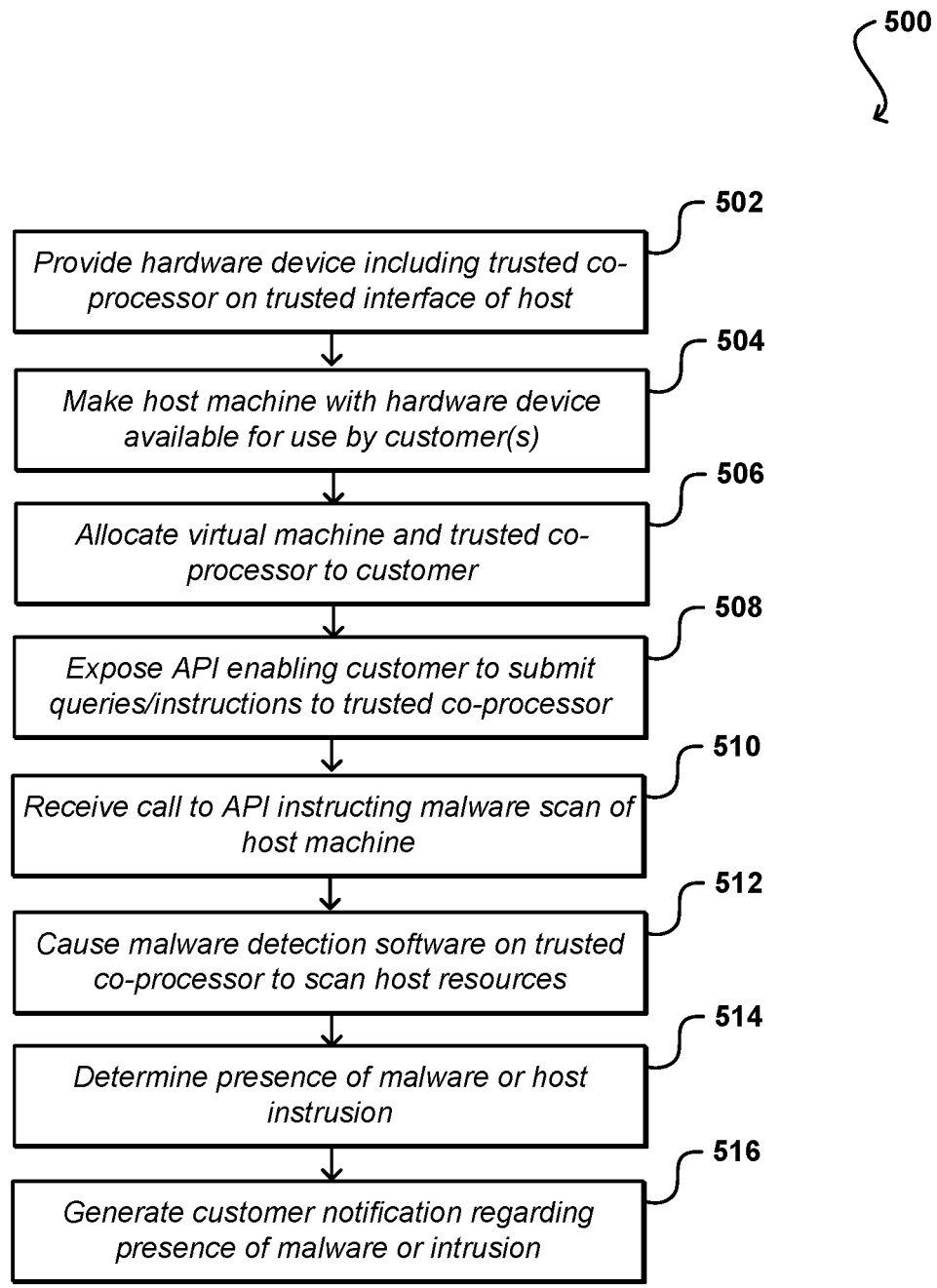
FIG. 5 illustrates an example process for performing a malware scan on a host device from a trusted co-processor that can be utilized in accordance with various embodiments.

FIG. 5 illustrates an example process 500 for enabling a customer to utilize a trusted hardware device to verify the state of a host computing device that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a trusted co-processor is provided 502 (i.e., installed, configured, or allocated) on a trusted interface of a host computing device. In some embodiments, this can include installing a peripheral card, such as a PCI card or USB stick, into an appropriate port or slot on a server or other host computing device. The host computing device with the trusted co-processor can be made 504 available from a fleet of resources for use by, or on behalf of, various customers. This can include, for example, installing the device in a rack in a data center and connecting the server to a network of resources in a resource provider environment. The device can be in communication with a resource manager, or other such system or service, configured to allocate resources for performing various customer tasks.

A request can subsequently be received from (or on behalf of) a customer of the resource provider, where the request involves access to at least one host computing device that includes a trusted co-processor or other trusted enclave as discussed or suggested herein. In response to the request, a host computing device with a trusted co-processor (an available capacity, appropriate configuration, etc.) and a virtual machine (VM) can be allocated 506 (partially or completely) for use by that customer, at least for a determined period of time. The customer can be provided with address information for communicating directly with the device, or routing information can be updated for the network, among other such options. In addition to providing access to the resource, the customer in some embodiments can be provided with "expected" information pertaining to the trusted co-processor and/or host computing device. This can include, for example, indication of a cryptographic key stored by the host and known by the customer, such as an endorsement key burned into a trusted platform module (TPM) of the peripheral device. The expected information can also include one or more expected measurement values for the configuration of the peripheral device, as may include checksums or hashes of various memory ranges, firmware, or other such information as discussed elsewhere herein. A request for verification can be received from the customer, and in response the customer can be provided with verification data from the host device. This verification data can correspond to the type of expected information that was previously provided. For example, if a hash value was given for a specific memory range then the verification data can include a hash value corresponding to the information currently in those memory ranges. A digital signature or other such information can be provided as well as discussed herein. A determination can be made as to whether the verification passes, such as by the verification information verifiable or otherwise as expected. If so, logical ownership of the trusted co-processor and/or peripheral device can be transferred over to the customer, even though the card is installed in a host computing device owned by the provider. The customer can thus be enabled to take over control (i.e., root level control) of the trusted co-processor, which in some cases can include locking out the provider from accessing the trusted co-processor. If the information cannot be verified (cryptographically or otherwise), or is determined to be different than expected, another host can be selected and verification information provided until the customer accepts one of the peripheral cards as a trusted appliance. It should be understood, however, that in some embodiments a customer may take logical ownership and/or control of the trusted co-processor before performing the measurement, which can prevent any unintended modification from occurring between the verification and the transfer of control in at least some embodiments.

Once the customer has taken ownership of the peripheral device, the customer can use that device as an observation point to verify operation, configuration, state, or other such information for the provider-owned host. At least one API can be exposed 508 that enables the customer to submit queries and/or instructions to the trusted co-processor, which can involve various observational or interrogational tasks. In this example, a call can be received 510 to the API including an instruction to run a malware scan of the host computing device. As mentioned, the hardware device can include a trusted co-processor and memory that is able to execute malware software and interrogate the resources of the host machine in order to determine the presence of malware, or other such intrusion or compromised information, on the host machine. The malware can be any appropriate malware for scanning such devices, as may be provided by a provider of the resources or obtained from a third party, such as may include malware software like Kapersky Lab, ESET, AVIRA, Bitdefender, eScan, and Panda, among others. The malware software can be caused 512 to be executed on the trusted co-processor in order to scan the relevant resources of the host machine. As mentioned, the scanned resources can include memory, processors, and physical storage, among others. The software can analyze the data, code, and other relevant information on the resources to determine 514 the presence of malware on the host machine. As mentioned, the trusted co-processor might include updated libraries in order to detect the most recently discovered malware threats. After the determination of the presence of malware is made, a customer notification can be generated 516 indicating whether or not malware was found on the host. As mentioned, the notification can be sent through a trusted out-of-band channel if available. If sent through a front channel accessible to the host processor or virtual machine, for example, the notification might be digitally signed or otherwise encrypted or protected in order to prevent tampering by the malware on the host.

Figure 6:
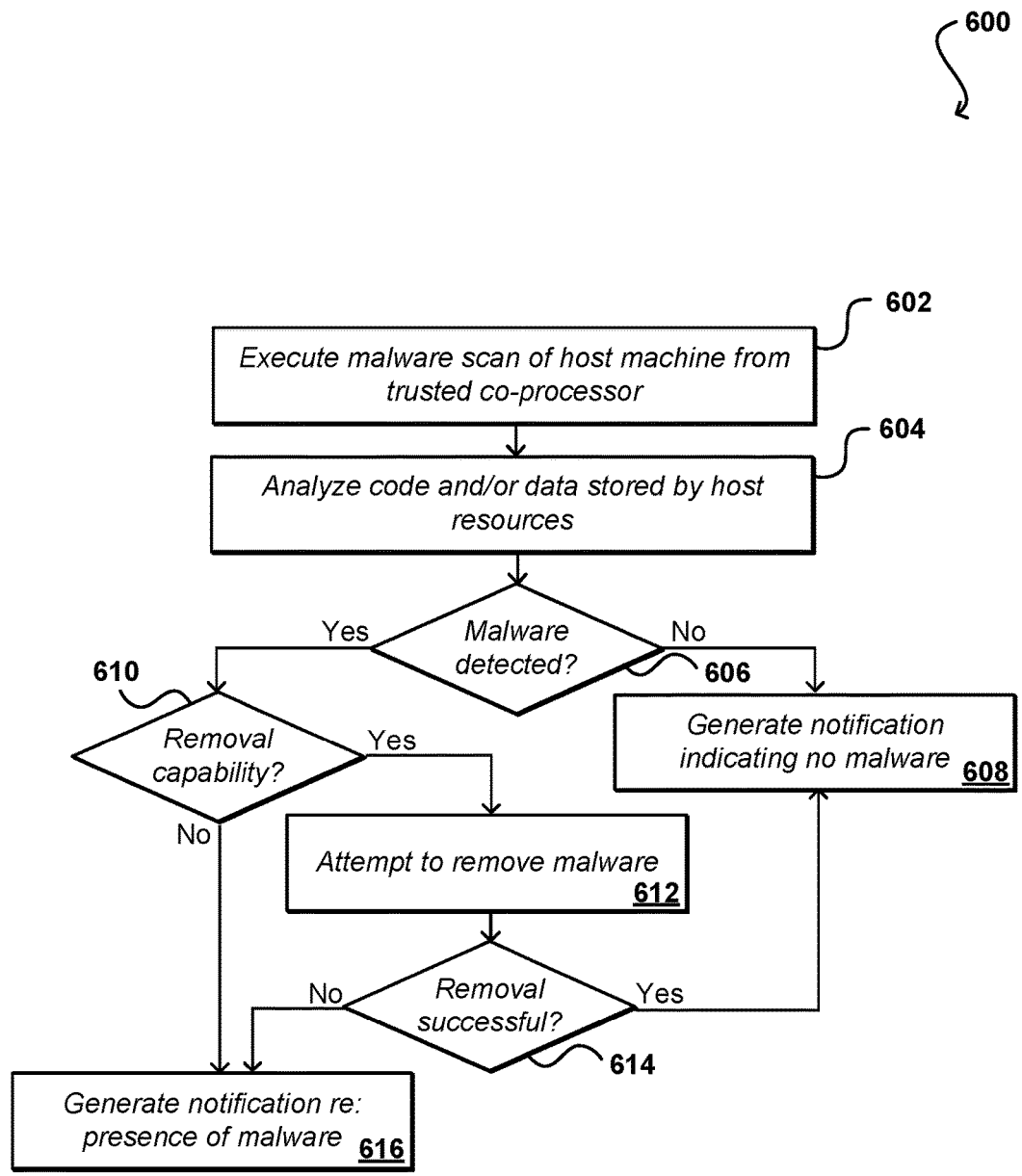
FIG. 6 illustrates an example process for managing the detection of malware on a host device that can be utilized in accordance with various embodiments.
Figure 7:
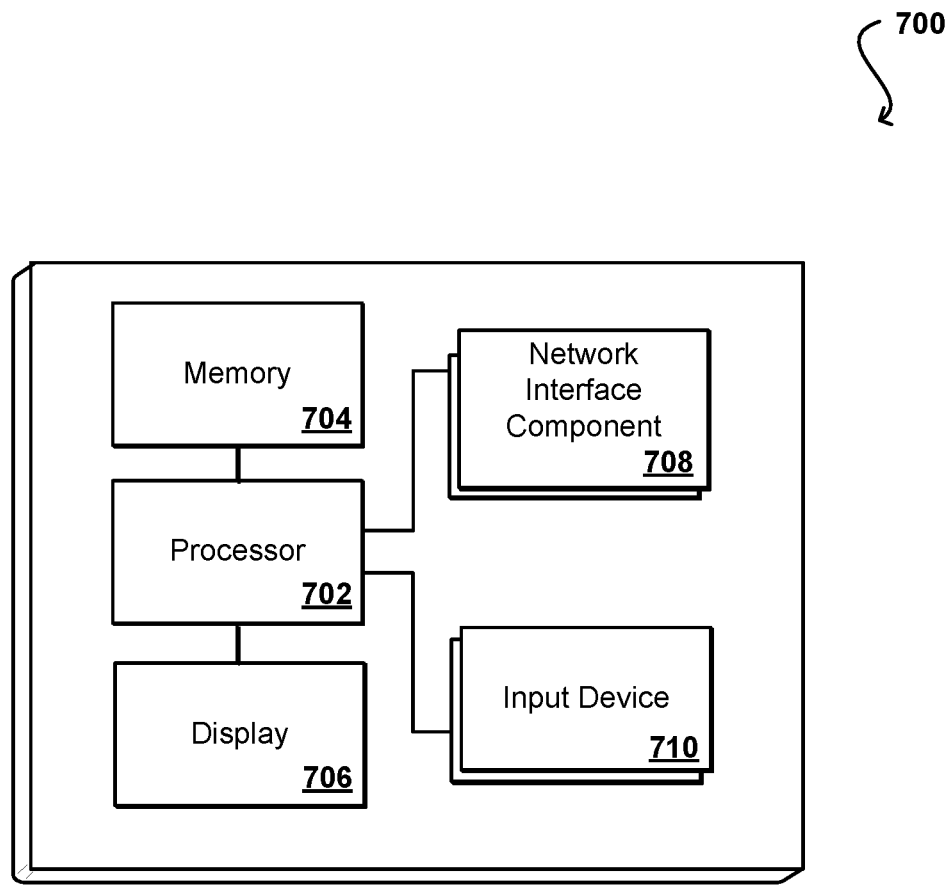
FIG. 7 illustrates example components of a computing device that can be utilized in accordance with various embodiments.

FIG. 6 illustrates an example process 600 that can be utilized to manage malware detected on a host machine that can be utilized in accordance with various embodiments. In this example, logical ownership of the trusted co-processor, peripheral card, or other trusted enclave has been transferred to a customer from a resource provider. As mentioned, in at least some embodiments the provider and any other entity will be locked out from the trusted enclave, and the trusted enclave can provide limited access into the host computing device in which the enclave exists. A customer request, or other such instruction, can have been received to scan the host machine, or at least a virtual machine hosted on the host machine, for malware or other such compromising of the host. In some embodiments the request can have been received from a third party having a relationship with the customer but not having ownership or access rights to the trusted enclave. In other embodiments, the third party might have logical ownership of the trusted enclave in order to provide security services to the customer, among other such options. In response, a malware scan of the host machine can be executed 602 from the trusted co-processor logically owned by the customer. This can include obtaining data or code stored by various resources indicated by, or identified for, the scan. The code and/or data can then be analyzed 604 by the malware software in order to determine whether, based at least in part upon the current malware libraries stored on the trusted hardware, malware is present on the host machine. If it is determined 606 that no malware is present, a notification can be generated 608 in this example indicating to the customer (or another appropriate entity or recipient) that the host machine, or relevant portion(s) of the host machine, was determined to be free of malware.

If malware is detected 606 by the malware software, a determination can be made 610 as to whether malware removal capability is available and/or activated for the trusted co-processor. If not, a notification can be generated 616 indicating that malware was detected on the host machine. The customer or another appropriate entity or component can then determine an appropriate action to take, such as to cease operations on the host machine. If, however, malware removal capability is available, the malware software executing on the trusted co-processor can attempt 612 to remove the malware from the host device. Various approaches can be used to attempt to remove the malware and determine whether the malware removal was successful, as known or used in the art for such purposes. If it is determined 614 that the removal was successful, a notification can be generated 608 as discussed previously indicating that the host is free of malware. In this instance the notification might also indicate that malware was detected and removed, or a log entry can be made that includes that information, among other such options. If the removal is determined 614 to be unsuccessful, or only partially successful, then a notification can be generated indicating that malware was located and could not be removed. Various other notifications or actions can be initiated as well within the scope of the various embodiments.

As mentioned, a trusted co-processor in at least some embodiments can be logically owned by the customer, but physically owned and operated by the provider, with the customer being able to lock the provider from accessing at least some functionality on the trusted co-processor. The trusted co-processor can take the form of a peripheral card that is shipped in the host machine, and physically bolted or otherwise connected inside the host. The level of visibility is thus limited in at least some embodiments to the host in which the card is installed. As mentioned elsewhere herein, such functionality can be provided without dedicated hardware. Such approaches can use various software mechanisms to provide a trusted customer enclave inside a provider host machine as discussed elsewhere herein.

In some embodiments, the trusted enclave may not be provisioned with verifiable credentials such as a certificate. For these situations, a specific provisioning process can be utilized where physical access to the host can be used instead. In some embodiments the attesting of a remote system can require special privileges. Certified credentials for the requesting entity can be established, where possible, and used to validate the authenticity of the attestation request. Most notably, a certified asymmetric key pair can be used and the attestation request signed. In some embodiments, neither the host identity nor the virtual image identifier needs to be known for attestation. The host identity does not necessarily need to be known at the time of attestation request generation, and the virtual image identifier can be reported back as part of the attestation quote, whereby the acceptable values can be determined.

In at least some embodiments the quote does not need to be restricted to the defined quote mechanism and may include additionally signed information using the identity key of the system. The host attestation response can include sufficient information to determine the authenticity of multiple virtual images. This can be performed in some embodiments by returning multiple quotes, or combining multiple results into a single quote. Further, while a two system hierarchy is presented for purposes of explanation, it should be stated that any appropriate tree or hierarchical structure with a parent node of the certificate authority can be used as well within the scope of the various embodiments, wherein each node in the tree is signed by the parent node. Similarly there can be any number of root certificate authorities in at least some embodiments. In one such system, the trusted co-processor forms a root for a family of subsystems contained within the single host.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A host computer system, comprising:
   at least one processor;
   a first memory including first instructions that, when executed by the at least one processor, cause the host computer system to operate in a resource provider environment owned by a resource provider; and
   a peripheral device including a co-processor and second memory for storing second instructions, the peripheral device connected to the host computer system using a core system bus, the peripheral device further being under logical control of a customer of the resource provider such that the customer is a sole entity enabled to cause actions to be performed by the peripheral device, the peripheral device further including an interface enabling a request to be received to scan at least a subset of resources of the host computer system for malicious software, the peripheral device configured to obtain data from the host computer system using the core system bus independent of the at least one processor, the peripheral device further configured to analyze the data using malicious software detection software executing on the co-processor and provide a notification regarding detection of the malicious software on the host machine, wherein the malicious software on the host machine is unable to gain access to the peripheral device.

2. The host computer system of claim 1, wherein the peripheral device is further configured to obtain at least one of data or code from at least the subset of resources, the subset of resources including at least one of a processor, memory, or a data storage device.

3. The host computer system of claim 1, wherein the peripheral device is further configured to provide the notification for the customer using a out-of-band channel inaccessible to the at least one processor of the host computer system.

4. The host computer system of claim 1, wherein the peripheral device is further configured to secure the notification using at least one credential accessible on the peripheral device but inaccessible to the at least one processor of the host computing machine, the peripheral device further configured to provide the notification for the customer using a channel accessible to the at least one processor of the host computer system, wherein malicious software executing on the at least one processor is unable to modify the notification in a way that is undetectable to the customer.

5. A computer-implemented method, comprising:
   receiving a request to a limited subsystem operating on a host computer device, the limited subsystem under logical control of a first entity different from a second entity having logical control of the host computer device, the request relating to a scan for malicious software on a virtual resource of the host computer device by detection software executing on a first processor in the limited subsystem, the virtual resource allocated to the first entity and being external to the limited subsystem;
   obtaining, by the limited subsystem and independent of a second processor of the host computer device, data from the virtual resource;
   analyzing the data using detection software executing on the first processor of the limited subsystem;
   determining, by the first processor of the limited subsystem, a presence of malicious software on the virtual resource; and
   providing, from the limited subsystem, a notification regarding the presence of malicious software on the virtual resource.

6. The computer-implemented method of claim 5, further comprising:
   providing the notification using an out-of-band channel inaccessible to the second processor of the host computer device.

7. The computer-implemented method of claim 5, further comprising:
   securing the notification using at least one credential accessible to the limited subsystem but inaccessible to the second processor of the host computer device; and
   provide the notification using a channel accessible to the second processor of the host computer device, wherein malicious software executing on the second processor is unable to modify the notification in a way that is undetectable to the first entity.

8. The computer-implemented method of claim 5, wherein securing the notification includes at least one of encrypting the notification using an encryption key or signing the notification using a digital signature.

9. The computer-implemented method of claim 5, wherein the resources include at least one of the second processor, a process executing on the second processor, memory, or a data storage device.

10. The computer-implemented method of claim 5, wherein the malicious software is unable to access the limited subsystem.

11. The computer-implemented method of claim 5, further comprising:
   receiving a malicious software library update to the limited subsystem, the malicious software library update unable to be undetectably modified by the malicious software.

12. The computer-implemented method of claim 5, further comprising:
   attempting, by the limited subsystem, to remove the malicious software from the host computer device.

13. The computer-implemented method of claim 5, wherein the limited subsystem is a peripheral card including the first processor, and further comprising:
   obtaining at least one type of verification information at least in part by interrogating a peripheral component interconnect (PCI) bus of the host computer device;
   verifying, by the limited subsystem, the verification information;
   providing logical control over the limited subsystem to the first entity; and
   preventing the second entity from accessing the limited subsystem while the limited subsystem is under logical control of the first entity.

14. The computer-implemented method of claim 5, wherein the second entity is a resource provider and the first entity is a customer of the resource provider, the host computer device being located in a resource provider environment under control of the resource provider.

15. The computer-implemented method of claim 5, further comprising:
   limiting an amount of visibility of the limited subsystem into operation of the host computer device before granting logical ownership of the limited subsystem to the first entity.

16. A limited subsystem operating on a host computer device, comprising:
   at least one processor; and
   memory storing instructions that, when executed by the at least one processor, cause the limited subsystem to:
      receive a request to the limited subsystem, the limited subsystem under logical control of a first entity different from a second entity having logical control of the host computer device, the request relating to a scan for malicious software on resources of the host computer device by detection software executing in the limited subsystem;
      analyze, by a first processor of the limited subsystem, data from a virtual resource on the host computing device, the virtual resource being external to the limited subsystem, the data being obtained over a core system bus independent of a second processor of the host computer device;
      determine, by the first processor of the limited subsystem, a presence of malicious software on the virtual resource; and
      provide, from the limited subsystem, a notification regarding the presence of malicious software on the virtual resource, wherein a second processor of the host computing system is unable to undetectably modify the notification.

17. The limited subsystem of claim 16, wherein the limited subsystem is a peripheral card including a trusted co-processor, and wherein the instructions when executed further cause the limited subsystem to:
   provide the notification using an out-of-band channel inaccessible to the second processor or a front channel accessible to the second processor, the notification being secured by the limited subsystem if sent over the front channel wherein malicious software executing on the second processor is unable to modify the notification in a way that is undetectable to the first entity.

18. The limited subsystem of claim 17, wherein the notification is secured by at least one of encrypting the notification using an encryption key or signing the notification using a digital signature.

19. The limited subsystem of claim 17, wherein the request is received from a third entity associated with the first entity.

20. The limited subsystem of claim 17, wherein the instructions when executed further cause the limited subsystem to:
   attempt, by the limited subsystem, to remove the malicious software from the host computer device.

* * * * *